United States Patent [19]

Knepper et al.

[11] Patent Number: 5,534,588

[45] Date of Patent: Jul. 9, 1996

[54] ROOM TEMPERATURE VULCANIZABLE SILICONE COMPOSITIONS EMPLOYING PHENYL SUBSTITUTED TRIS-FUNCTIONAL KETOXIME SILANES

[75] Inventors: Jeffrey A. Knepper, Branchburg; Dale R. Flackett, Somerset; Edward T. Asirvatham, Chatham, all of N.J.

[73] Assignee: AlliedSignal Inc., Morris County, N.J.

[21] Appl. No.: 443,286

[22] Filed: May 18, 1995

Related U.S. Application Data

[63] Continuation of Ser. No. 248,615, May 24, 1994, abandoned.

[51] Int. Cl.$^6$ .................................................... C08K 5/54
[52] U.S. Cl. ...................... 524/730; 524/785; 524/786; 524/860; 524/783; 524/779; 524/789; 523/212; 523/213; 528/18; 528/15; 528/17; 528/19; 528/901
[58] Field of Search .................... 528/18, 17, 15, 528/19, 901; 524/785, 730, 786, 860, 783, 779, 789; 523/212, 213

[56] References Cited

U.S. PATENT DOCUMENTS

| | | | |
|---|---|---|---|
| 2,938,009 | 5/1960 | Lucas | 260/37 |
| 3,004,859 | 10/1961 | Lichtenwalner | 106/308 |
| 3,189,576 | 6/1965 | Sweet | 260/46.5 |
| 3,274,145 | 9/1966 | Dupree | 260/37 |
| 3,635,743 | 1/1972 | Smith | 106/288 |
| 3,837,878 | 9/1974 | Beers | 106/308 |
| 4,371,682 | 2/1983 | Hashimoto. | |
| 4,380,660 | 4/1983 | Mathew et al. | 556/422 |
| 4,400,527 | 8/1983 | Mathew et al. | 556/422 |
| 4,546,017 | 10/1985 | Flackett. | |
| 4,657,967 | 4/1987 | Klosowski et al. | 524/860 |
| 4,673,750 | 6/1987 | Beers et al. | 528/18 |
| 4,705,877 | 11/1987 | Gornowicz et al. | 556/422 |
| 4,720,530 | 1/1988 | Wurminghausen et al. | 528/18 |
| 4,973,623 | 11/1990 | Haugsby. | |
| 5,013,781 | 5/1991 | Koshii et al. | 528/901 |
| 5,118,755 | 6/1992 | Endo et al. | 528/18 |

FOREIGN PATENT DOCUMENTS

| | | |
|---|---|---|
| 0036262 | 9/1981 | European Pat. Off. . |
| 0102268 | 3/1984 | European Pat. Off. . |
| 0370643 | 5/1990 | European Pat. Off. . |
| 2558169 | 7/1985 | France . |

*Primary Examiner*—Melvin I. Marquis
*Attorney, Agent, or Firm*—Lois A. Giannechi

[57] ABSTRACT

A room temperature vulcanizable silicone rubber composition with high elongation and low modulus comprising 10–90 percent by weight polydiorganosiloxane having terminal hydroxyl groups, 1–10 percent by weight phenyl tris-functional ketoximino-containing silane crosslinker, 0–14 percent by weight of a reinforcing or 0–60 percent by weight of a nonreinforcing filler or semi-reinforcing filler or a mixture thereof for a total of all fillers in the range of from about 6–60 percent by weight, from 0–2.5 percent by weight of an organofunctional silane adhesion promoter and an optional plasticizer and catalyst. These compositions cure to elastic materials useful as caulking materials, adhesives, coatings and encapsulating materials for the construction and other industries.

25 Claims, No Drawings

ROOM TEMPERATURE VULCANIZABLE SILICONE COMPOSITIONS EMPLOYING PHENYL SUBSTITUTED TRIS-FUNCTIONAL KETOXIME SILANES

This application is a continuation of application Ser. No. 08/248,615 Filed May 24, 1994, now abandoned.

BACKGROUND OF THE INVENTION

1. Field of the Invention

The present invention relates to one component silicone compositions which cure at room temperature to form elastomeric products. More particularly the present invention relates to room temperature vulcanizable (RTV) silicone rubber compositions having high elongation and low modulus.

2. Description of the prior art

Oxime silanes are known in the art. U.S. Pat. No. 3,189,576 describes oxime silanes useful for forming one component room temperature curing coating and caulking compositions. This class of organosilicon intermediates is described by the general formula $(X=NO)_a SiR'_{4-a}$. Although many publications describe the use of oxime silanes as crosslinkers in RTV silicone compositions, none discloses the specific use or advantage of employing a phenyl substituted tris-functional ketoxime silane. Tris-functional describes silanes containing three hydrolyzable groups bonded to the silicon atom.

U.S. Pat. No. 3,996,184 teaches the use of a difunctional amide, specifically methyl vinyl di-(N-organo acetamido)silane, as a coupler and aminoxy functional polysiloxane as crosslinker to achieve a low modulus sealant. Such aminoxy functional polysiloxanes are also described in U.S. Pat. Nos. 3,341,486; 3,441,583; 3,528,941; and 3,926,199. A disadvantage of such systems is the limited availability of difunctional amides and also the undesirable use of solvents employed therewith. Furthermore, the methyl vinyl di-(N-organo acetamido)silane lacks adequate color stability since it darkens over a relatively short storage time.

It is desirable to find a one component, high elongation, low modulus sealant with good adhesion to various substrates without the use of such solvents or amides and which have better color stability. The composition of this invention can provide low modulus RTV compositions without the use of solvents and amides and which utilize phenyl substituted tris-functional ketoxime silanes.

U.S. Pat. No. 4,546,017 teaches the use of titanium chelates to achieve low modulus sealants with improved adhesion. Such sealants are difficult to produce in desirable white colors due to the presence of titanium chelates which are used at levels which produce a yellow hue to the sealant. Also, such sealants tend to undesirably produce a separation or migration of the titanium chelate from the main body of the sealant. The compositions of this invention produce low modulus sealants with sufficient adhesion for commercial applications yet with significantly reduced yellowing and no separation of ingredients due to the lack of high levels of titanates. The silanes of this invention also exhibit beneficial characteristics such as shelf life, adhesion, a relatively low corrosive nature, and generally low odor. Methyl tris-(methyl ethyl ketoximino)silane, vinyl tris-(methyl ethyl ketoximino)silane and tetrakis-(methyl ethyl ketoximino)silane are the predominant oxime silanes used commercially and which are most readily available for use as crosslinkers in oxime RTV compounds. Heretofore it has been very difficult to achieve low modulus RTV sealants with these oxime silanes without encountering several disadvantages. Currently, a common way to achieve low modulus oxime RTV silicone compounds is to add very high levels of non-reactive or hydroxyl free silicone plasticizer such as trimethylsiloxy-endblocked polydimethylsiloxanes. Unfortunately, the use of such levels of plasticizer tends to greatly increase the likelihood of plasticizer bleed in the sealant. Plasticizer bleed is a disadvantage because it increases unsightly dirt pick-up in adjacent areas in masonry applications. Another disadvantage is that sealants which bleed may also harden and increase modulus more so than if the plasticizer stayed within the sealant. Additionally, hardening may produce greater stresses at the adhesive interphase, jeopardizing the bond, i.e. adhesion, to the substrate. Also, using high levels of plasticizer often leads to slower tack free times and rubberization times of the sealant. This increases the likelihood of cracking during cure if movement occurs. By using phenyl substituted tris-functional silanes, much lower modulus can be achieved than with using methyl tris-(methyl ethyl ketoximino)silane, vinyl tris-(methyl ethyl ketoximino)silane, tetrakis-(methyl ethyl ketoximino)silane or combinations thereof in similar compositions and while achieving a reasonable cure profile. This can be achieved at the same or lower plasticizer levels in comparable formulations. Using methyl tris-(methyl ethyl ketoximino)silane as the sole crosslinker can produce a low modulus sealant by using very low amounts of tin catalyst. This kind of formulation (because of its long tack free time and rubberization time), however, will have an undesirable cure profile and is more likely to crack during cure, severely limiting usefulness. Methyl tris-(methyl ethyl ketoximino)silane/vinyl tris-(methyl ethyl ketoximino)silane combinations can be employed with low levels of tin catalyst, but the resulting sealant will have lower elongation and higher modulus at 100% elongation than a comparable formulation using phenyl tris-functional ketoximino silanes of this invention. The same is generally true for combinations of tetrakis-(methyl ethyl ketoximino)silane and vinyl tris-(methyl ethyl ketoximino)silane or methyl tris-(methyl ethyl ketoximino)silane. Thus, the RTV silicone compositions of this invention provide a sealant with the same or lower cure profile, including skin time, tack free time and scratch time, but simultaneously have a much higher elongation at break and much lower modulus. The same compositions also have a desirable cure profile in that usually, long skin over times and short scratch times are observed. Long skin over times are desirable when considering tooling and the working time of the sealant in its application. Short scratch times relative to skin over times are desirable in that they tend to provide resistance to cracking during the cure of the sealant due to movement.

DETAILED DESCRIPTION OF THE INVENTION

The composition of the present invention is a one component RTV silicone composition comprising: (A) hydroxyl endblocked polyorganosiloxane, (B) at least one phenyl substituted tris-functional ketoximino silane, (C) an optional filler, and (D) an optional adhesion promoter. Depending on the desired cure rate, a tin catalyst (E) may also be added. The compositions may also employ a plasticizer, such as a triorganosilyl endblocked diorganopolysiloxane plasticizer (F) to adjust the extrusion rate and lower modulus as desired. The present invention may have various additives such as a pigment, thixotropic agent, fungicide, mildewcide, ultraviolet ray absorber, heat resistance improving agent, flame retardant, thermal and electrically conductive fillers, etc.

The sealant composition of the present invention contains (A) a hydroxyl endblocked diorganosiloxane which has a viscosity generally between 100 to 500,000 centipoise at 25° C., preferably from 2,000 to 350,000 centipoise and most preferably from about 2,000 to about 150,000. These diorganosiloxane polymers are well-known in the art. The polymer may have the following general formula

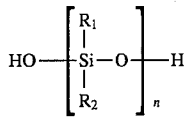

where n varies such that the viscosity of the polymer varies within the indicated range. The $R_1$ and $R_2$ organo groups are independently monovalent hydrocarbon radicals or monovalent halogenated carbon radicals. Examples of such monovalent hydrocarbon radicals are methyl, ethyl, propyl, butyl, phenyl, methylphenyl, ethylphenyl, vinyl, allyl, cyclohexyl, tolyl, and isopropyl. Examples of monovalent halogenated hydrocarbon radicals are chloropropyl, 3,3,3-trifluoropropyl, chlorophenyl, beta-(perfluorobutyl)ethyl, and chlorocyclohexyl. Preferably the organic radicals are methyl, ethyl, phenyl, vinyl, and 3,3,3-trifluoropropyl. The polydiorganosiloxane can have in addition to the diorganosiloxane units, mono-organosilsesquioxane units, triorganosiloxy units, and $SiO_2$ units. Polydiorganosiloxanes which have both hydroxyl endblocking and triorganosiloxy endblocking may also be used and are described in U.S. Pat. No. 3,274,145, which is incorporated herein by reference. Component (A) can be a mixture of two or more polyorganodisiloxanes as long as the average viscosity of the mixture falls within the viscosities stated above.

The amount of polymer (A) used in this invention ranges from about 10 to about 90 percent by weight of the total composition, preferably, from about 30 to about 70 percent by weight of the total composition.

The trifunctional crosslinking agent (B) has the formula: $R-Si(OR')_p(ON=CR''R''')_{3-p}$, where R is phenyl, and p is 0, 1 or 2; R, R" and R''' may be, independently of each other, any saturated straight chain or branched alkyl radical of 1 to 8 carbon atoms. While it is generally preferred that the crosslinker have three ketoximino groups as the hydrolyzing radicals, a phenyl alkoxy-ketoximino silane is also included in this invention when p=1 or 2. For the alkoxyketoximino silane, it usually exists as a mixture of trifunctional silanes. For example, when p=1, the mixture may also contain a silane having two alkoxy radicals and one ketoximino radical, a silane having three alkoxy radicals to no ketoximino radicals, and a silane having three ketoximino radicals to no alkoxy radicals. When p=1, the preponderance of the mixture is a silane which has two ketoximino radicals and one alkoxy radical. Similarly, when p=2 the preponderance of the mixture is a silane which has two alkoxy radicals and one ketoximino radical. In some applications the presence of alkoxy groups may diminish the stability of the silane, i.e. decrease its storage life. Thus, preferably, p=0 such that a phenyl tris ketoximino silane is utilized in the composition of this invention.

The process for preparing such ketoximino silanes is known in the art. U.S. Pat. Nos. 4,380,660; 4,400,527 and 3,186,576 disclose various phenyl substituted ketoximes which can be used in this invention and such are incorporated herein by reference. Illustrative of some of these ketoximes are methyl ethyl ketoxime, diethylketone oxime, acetone oxime, methyl isobutyl ketoxime, methyl amyl ketoxime, and cyclohexanone oxime. One of the more preferred silane crosslinking agents (B) in this invention is phenyl tris-(methyl ethyl ketoximino)silane. Crosslinker (B) is preferably present in an amount of from about 1 to about 10 percent by weight of the total composition, and preferably from about 3 to about 7 percent by weight.

Although it is preferred that crosslinker (B) is the sole crosslinker used in this invention, in another embodiment of the invention crosslinking agent (B) includes mixtures of phenyl substituted tris functional silanes with other crosslinkers. Such can be selected from crosslinkers known in the art such as methyltrimethoxysilane, vinyltrimethoxysilane, methyltriethoxysilane, vinyltriethoxysilane, methyltriacetoxysilane, methyl tris-(N-methylbenzamido)silane, methyl tris-(isopropenoxy)silane, and methyl tris(cyclohexylamino)silane.

Illustrative of other optional silane crosslinkers which can be employed include, but are not limited to, methyl tris-(methyl ethyl ketoximino)silane, vinyl tris-(methyl ethyl ketoximino) silane, methyl tris-(methyl isobutyl ketoximino)silane, vinyl tris-(methyl isobutyl ketoximino)silane, tetrakis-(methyl ethyl ketoximino)silane, tetrakis-(methyl isobutyl ketoximino)silane, and tetrakis-(methyl amyl ketoximino)silane. Difunctional ketoximino silanes may also be used such as dimethyl bis-(methyl ethyl ketoximino)silane, methyl vinyl bis-(methyl ethyl ketoximino)silane, methyl vinyl bis-(methyl isobutyl ketoximino)silane, and methyl vinyl bis-(methyl amyl ketoximino)silane. Tetrafunctional alkoxy-ketoxime silanes as disclosed in U.S. Pat. Nos. 4,657,967 and 4,973,623 can also be used to modulate cure speed of the present invention. Similarly other tetrafunctional alkoxy-ketoximino silanes as described in U.S. patent application Ser. Nos. 947,015 filed Sep. 17, 1992 U.S. Pat. No. 5,359,108; 143,777 filed Nov. 1, 1993 U.S. Pat. No. 5,405,984 and 158,660 filed Nov. 29, 1993 U.S. Pat. No. 5,405,930 can be used. All of the above patents and application are incorporated herein by reference. All of the above crosslinkers may be added as mixtures with crosslinkers (B) or added separately to the composition of this invention. It is desirable to use these crosslinkers in conjunction with (B) at a level of at 0 to 25 percent of the total crosslinker level. Using crosslinkers other than (B) in increasing amounts, in conjunction with (B) generally increase the modulus and decrease the elongation of the cured composition of this invention. Crosslinker (B) as well as other crosslinkers used can be added to (A) before the addition of other ingredients under anhydrous conditions.

The composition of the present invention also contains (C) a filler. The filler can be a reinforcing filler or non-reinforcing filler or mixtures thereof. Examples of reinforced fillers are silica fillers, such as, fumed silica and precipitated silica. The fumed silica can be used as is or treated to provide a hydrophobic surface. Examples of treated fillers are those surface treated with polydimethylsiloxane, octamethylcyclotetrasiloxane, or hexamethyldisilazane. Although the amount and type of filler will vary with the desired properties for the end composition, preferably, fumed silicas are used which have surface areas ranging from 90 to 300 $m^2$/gram. More preferably fumed silicas with surface areas of 130 to 200 $m^2$/gram are used. The amount of reinforcing filler used preferably ranges from 0 to about 14 percent by weight of the total composition; and it is preferred to use 2 to 8 percent by weight. Use of reinforcing fumed silicas impart increased tensile strength of the cured composition as well as providing thixotropic character to the uncured composition. A nonreinforcing or semi-reinforcing filler can also be used. Examples of such fillers are fillers with surface areas of 2 to 90 $m^2/gm$ such as ground or precipitated calcium carbonate (treated and untreated), and ground quartz etc. Other semireinforcing fillers or extending fillers which are known in the art may be used. These are but are not limited to silica aerogel, diatomaceous earth, iron oxide, titanium oxide, aluminum oxide, zirconium silicate, calcined clay, magnesium oxide, talc, wollastonite, hydrated alumina, and carbon black. The amount of non-reinforcing or semi-reinforcing filler used preferably ranges from 0 to about 60 percent by weight of the total composition.

The total of all fillers used preferably ranges from about 6 to about 60 percent by weight of the total composition in this invention. The filler may be used as alone or in the form of a mixture of two or more. They may also be used with in the present invention with reinforcing fillers stated above. The reinforcing filler as well as other fillers are preferably added after the crosslinker and polymer have been mixed. The filler(s) is added under anhydrous conditions to avoid undesired exposure to moisture.

The composition of the present invention may also contain an optional adhesion promoter (D). Selection of an adhesion promoter will vary with the desired application since the choice of adhesion promoter can significantly effect the degree of adhesion to substrates. The selection of adhesion promoter can also effect cure speed and modulus of the composition as well. Typically an adhesion promoter (D) can be chosen from many organofunctional silanes known in the art. Examples of such are gamma-aminopropyltriethoxysilane, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, 3-glycidoxypropyltrimethoxy silane, gamma-mercaptopropyltrimethoxysilane, and gamma-methacryloxypropyltrimethoxysilane. Also useful as adhesion promoters are those ketoximino substituted aminosilanes described in U.S. Pat. No. 4,705,877, which is incorporated herein by reference. Preferred adhesion promoters in this present invention are gamma-aminopropyltriethoxysilane, N-(2-aminoethyl)-3-aminopropyltrimethoxy silane and 3glycidoxypropyltrimethoxy silane. Useful levels range from 0.001 to 2.5 percent by weight of the total composition. Preferably 0.5 to 1.0 percent by weight of the total composition is used. Mixtures of two or more of the adhesion promoters stated above can also be used, usually to obtain an improvement of properties such as improved resistance to hydrolysis, or improved adhesion.

The novel one component RTV silicone compositions of this invention can also comprise a catalyst (E) to accelerate the reaction of (A) with (B). Various catalysts may be used, for example, organotin carboxylates such as dibutyltin dilaurate, dibutyltin diacetate, dibutyltin dioctoate, dibutyltin maleate, dialkyl tin hexoates, and dioctyltin dilaurate etc. Other compounds as well may be utilized such as iron octanoate, zinc octanoate, lead octanoate, cobalt naphthenate etc. Titanium compounds may also be used such as tetrapropyltitanate and tetrabutyltitanate. Dibutyltindilaurate is the preferred catalyst. Useful levels of catalyst can range from 0.01 to 1.0 percent by weight of the total composition. Preferred levels are 0.02 to 0.1 percent by weight of the total composition.

A plasticizer (F) can be employed in the compositions of this invention. Plasticizers can be used to improve extrusion properties of the composition and to modify modulus of the cured composition. Well known plasticizers are triorganosilyl endblocked diorganopolysiloxanes, which can have a viscosity ranging from 10 to 100,000 centipoise at 25° C.

The organic groups are monovalent hydrocarbon radicals, which can be any monovalent hydrocarbon radical but more preferably from alkyl radicals of 1 to 8 carbons such as methyl. The plasticizer is added from 0 to 80 parts by weight per 100 parts by weight of (A). Preferred levels are 30 to 50 parts by weight per 100 parts by weight of (A). Preferred viscosity of the plasticizer is from 100 to 1000 centipoise at 25° C. Generally the plasticizer (if it is used in the composition) is added to the polymer (A), before the crosslinker (B) is added.

Other specialized additives may be added such as antioxidants, heat stabilizers, coloring pigments etc. to tailor the composition to a more specific application. Also, other materials can be added such as described in U.S. Pat. Nos. 5,036,125 and 5,118,738 which are incorporated herein by reference. These usually may be added at any stage of the mixing operation but care should be taken to add under anhydrous conditions such as not to introduce additional moisture.

The composition of the present invention can be used in the form of a one component or one package room temperature curing polysiloxane composition which is produced by mixing all of the above described components and various additives in the absence of moisture and is stored in a closed vessel (impervious to moisture). The composition is cured to a silicone elastomer upon exposure to atmospheric moisture at the time of use when the package is broken. Care must be taken to adjust crosslinker levels to the total level of moisture in the composition in order to ensure a stable one component package. Generally an excess of crosslinker (B) used alone or with other triketoximino functional silanes will protect the composition from the deleterious effects of moisture accidentally entering.

In evaluating the nature of the sealant composition, one must consider the factors comprising its cure profile. The composition of this invention at least maintains the cure profile obtainable by prior art sealants, but has a significantly increased elongation at break and a lower modulus. The most preferred composition additionally has a commercially acceptable white or light color as determined by one skilled in the art, as opposed to a composition which is yellowed or opaque.

Cure profile pertains to the skinover time, tackfree time, and rubberization time of the cured composition. Skinover time is the time measured from the moment the uncured sealant composition is exposed to ambient moisture to the time a finger which lightly touches the surface of the composition is withdrawn without transfer of the composition to the finger. Tackfree time is the time from exposure of the composition to ambient moisture until the time which a piece of polyethylene sheet placed on the composition with slight pressure is withdrawn without transfer of the composition to the polyethylene. Scratch or rubberization time is the time it takes for ambient moisture to provide a nick resistant layer on the surface of the sealant composition, such that when a finger gently moves a small area of the sealant, no cracking in the surface of the sealant occurs. Crack resistance for this invention means resistance of the composition to forming cracks or breaks while moving a bead of the composition during its cure. Modulus is defined for this invention as the tensile strength value obtained when the composition is at 100% elongation.

The composition of this invention preferably has a skinover time of about 60 minutes or less, or more preferably from about 5 minutes to about 60 minutes and most preferably from about 10 minutes to about 45 minutes. It preferably has a tackfree time of about 120 minutes or less, or more preferably about 100 or less and most preferably about 80 minutes or less. The composition preferably has a scratch time of about 180 minutes or less, or more preferably about 120 minutes or less and most preferably about 60 minutes or less. In addition, the lower the difference between the skinover time and the scratch time, the better crack resistance the composition demonstrates. In the preferred embodiment, the difference between skinover time and scratch time is about 120 minutes or less, preferably about 45 minutes or less and most preferably from about 20 minutes to about 45 minutes. The composition has an elongation at break of from about 700% to about 1,800%, preferably from about 500% to about 1,800% and most preferably from about 800% to about 1,800%. The composition has a modulus value of about 0.4 Mpa or less, preferably from about 0.05 to about 0.4 Mpa and more preferably from about 0.1 to about 0.3Mpa. In the preferred embodiment, the cured composition has a Shore A hardness in the range of from about 2 to 40 and preferably from about 5 to 30 as measured after 7 days at 25° C. and 50% relative humidity. As known in the art, it is often desired to vary the modulus property of the composition depending on the particular application involved. The compositions of this invention solve continuing industry needs with respect to making low modulus materials. The siloxane compositions of this invention provide cured compositions having low modulus silicone rubber or at least significantly lower than what can achieved with typical oxime crosslinkers (such as vinyl tris-(methyl ethyl ketoximino)silane) in the absence of crosslinker (B), using identical ingredients and levels for the remaining composition. The composition provides low odor and adhesion to a variety of substrates including pvc, acrylic, polycarbonate, aluminum, glass, ceramics, and many masonry surfaces. The compositions of this invention can serve a variety of applications such as providing coating, caulking and encapsulating materials. One such example is in the fabrication and installation of glazed units in the building industry. In such application the elastomer used to bond between substrates should have a relatively low modulus of elasticity which would permit or accommodate the relative movement between the glazing and the structure caused by temperature changes, wind and other stresses. Curing characteristics of such compositions depend on level and type of catalyst, adhesion promoter, and plasticizer. The modulus of the composition also can be affected by changes in the above. Another benefit of the present invention is that a desirable cure profile can be achieved while at the same time producing a low modulus sealant. This is difficult to do with most oxime silanes currently available. Compositions of this invention can also be made with lower viscosity polymers to provide low modulus sealant, whereas it is typical that very high viscosity polymers are currently utilized with oxime crosslinkers other than (B). The ability to use low viscosity polymer provides for easier mixing or handling in production. Often the combination of fillers and high viscosity polymer are not possible due to an accompanying undesirable increase in viscosity.

The following non-limiting examples serve to illustrate the invention. All parts in the examples are by weight.

EXAMPLE 1

A silanol-terminated polydimethylsiloxane (42.95 parts) having a viscosity at 25° C. of 150,000 centipoises is thoroughly mixed with a triorganosilyl endblocked diorganopolysiloxane (22.5 parts) having a viscosity of 100 centipoise at 25° C. The components are mixed in a Ross double planetary mixer fitted with a vacuum port. To this mixture is added 4 parts of phenyl tris(methyl ethyl ketoximino)silane (PhOS). This silane is mixed for 15 minutes under vacuum with the polymer and plasticizer. Next are added 25 parts of a stearic acid treated calcium carbonate of approximately 3 micron average particle size. The calcium carbonate is mixed until wetted by the liquid composition and then mixed for 5 minutes under vacuum. Untreated fumed silica (130 $m^2/gm$ surface area) is added to the composition and mixed in the same manner as the calcium carbonate at a level of 5 parts. To this composition is added 0.5 parts of gamma-aminopropyltriethoxysilane which is mixed under vacuum for 5 minutes. Dibutyltindilaurate is added last at 0.05 parts and mixed under vacuum for 5 minutes.

Four additional compositions are prepared in the same fashion except that vinyl tris(methyl ethyl ketoximino)silane (4 parts VOS) is utilized as crosslinker in one composition, methyl tris-(methyl ethyl ketoximino)silane (4 parts MOS) are utilized in another composition, a premixed combination of vinyl (1.5 parts) and methyl (2.5 parts) tris-(ketoximino)silanes is utilized in another composition, and a premix of 1.5 parts PhOS and 2.5 parts MOS are utilized in another composition. The freshly prepared compositions are drawn down on polyethylene sheets to a thickness of approximately 2 mm and exposed to normal laboratory atmosphere (approximately 50% R.H. and 22 C.) for one week. The physical properties of the freshly cured materials are then measured using dumbbell shaped pieces cut from the sheet (DIN 53 504, Die type S 2, 4 mm×2 mm×75mm) and a Lloyd L500 tensile testing machine. (The samples are then tested according to the West German standard DIN 53 504.) A Lloyd non-contacting infrared extensometer TTOX10/1000 is utilized. Hardness is measured using a Shore A durometer located on a platform (conveloader) with a standard load and velocity. Shore A measurements are taken instantaneously. Skin over time (SOT), tack free time (TFT) and scratch time are measured. Results are shown in Table I:

TABLE I

| Silane | Hardness (Shore A) | Elongation @ break (%) | Force @ break (N/mm$^2$) | Tensile @ 100% elongation (N/mm$^2$) | SOT (min) | TFT (min) | Scratch (min) |
| --- | --- | --- | --- | --- | --- | --- | --- |
| PhOS | 10 | 1200 | 1.00 | 0.14 | 16 | 30 | 60 |
| VOS | 14 | 962 | 1.34 | 0.23 | 20 | 29 | 37 |
| VOS/MOS | 18 | 720 | 1.38 | 0.28 | 10 | 29 | 38 |
| MOS | 13 | 988 | 1.17 | 0.21 | 17 | 60 | 360 |
| PhOS/MOS | 18 | 850 | 1.40 | 0.25 | 14 | 37 | 60 |

EXAMPLE 2

A series of compositions is prepared employing the same method of mixing as described in Example I. A silanol-terminated polydimethylsiloxane (40.0 parts) having a viscosity at 25° C. of 50,000 centipoises is thoroughly mixed with a triorganosilyl endblocked diorganopolysiloxane (12.0 parts) having a viscosity of 1000 centipoise at 25° C. PhOS is added to the mixture at a level of 4.5 parts. Next is added 40 parts of a stearic acid treated calcium carbonate of approximately 3 micron average particle size. Untreated fumed silica (130 m²/gm) is next added at a level of 3 parts. Gamma-aminopropyltriethoxysilane is added last at 0.5 parts.

Four other compositions are made in an identical manner as this composition except that in one composition 4.5 parts VOS is used as crosslinker, in another composition 4.5 parts MOS is used as crosslinker, in another composition a premix of 1.0 parts VOS and 3.5 parts MOS are used as crosslinker, and in another composition phenyl tris(methyl isobutyl ketoximino)silane (PhOS-2) is used at a level of 4.5 parts as crosslinker. The freshly prepared sheets are allowed to cure as described in Example I. Results as shown in Table II are measured by the same methods as described in Example I.

TABLE II

| Silane | Hardness (Shore A) | Elongation @ break (%) | Force @ break (N/mm²) | Tensile @ 100% elongation (N/mm²) | SOT (min) | TFT (min) | Scratch (min) |
| --- | --- | --- | --- | --- | --- | --- | --- |
| PhOS | 27 | 853 | 1.56 | 0.36 | 30 | 46 | 47 |
| VOS | 33 | 530 | 1.35 | 0.52 | 20 | 29 | 40 |
| VOS/MOS | 29 | 373 | 1.14 | 0.58 | 65 | 75 | 93 |
| MOS | 27 | 521 | 1.23 | 0.52 | 48 | 290 | >410 |
| PhOS-2 | 24 | 830 | 1.46 | 0.37 | 34 | 51 | 62 |

EXAMPLE 3

Two additional compositions are prepared employing the same method of mixing as described in Example I. A polydimethylsiloxane which is at least 80% endblocked with triorganosiloxy groups (47.0 parts) having a viscosity at 25° C. of about 14,000 centipoises is thoroughly mixed with a triorganosilyl endblocked diorganopolysiloxane (5.0 parts) having a viscosity of 1000 centipoise at 25° C. PhOS is added to the mixture at a level of 4.5 parts. Next is added 40 parts of a stearic acid treated calcium carbonate of approximately 3 micron average particle size. Untreated fumed silica (130 m²/gm) is next added at a level of 3 parts. Gamma-aminopropyltriethoxysilane is added last at 0.5 parts.

A composition is made similarly to the above except that vinyl tris-(methyl ethyl ketoximino)silane is used in place of the PhOS. The freshly prepared sheets are allowed to cure as described in Example I. Results as shown in Table III are measured by the same methods as described in Example I.

TABLE III

| Silane | Hardness (Shore A) | Elongation @ break (%) | Force @ break (N/mm²) | Tensile @ 100% elongation (N/mm²) | SOT (min) | TFT (min) | Scratch (min) |
| --- | --- | --- | --- | --- | --- | --- | --- |
| PhOS | 23 | 675 | 1.05 | 0.34 | 29 | 40 | 43 |
| VOS | 30 | 488 | 1.18 | 0.51 | 13 | 25 | 26 |

What is claimed is:

1. A room temperature vulcanizable composition which is storable and stable in one package when protected from moisture and cures upon exposure to moisture comprising:

(A) at least one polydiorganosiloxane having terminal hydroxyl groups in an amount sufficient to form a silicone composition which is curable to an elastomer upon crosslinking;

(B) at least one phenyl substituted tris-functional ketoximino silane crosslinking agent of the formula: R—Si(OR')$_p$(ON=CR"R''')$_{3-p}$ where R is phenyl, R', R", and R''' are, independently of each other, a saturated straight chain or branched alkyl radical of 1 to 8 carbon atoms and p=0, 1 or 2, said crosslinking agent present in an amount sufficient to crosslink the diorganosiloxane polymer in the presence of moisture;

(C) from about 0 to about 60 weight percent of at least one filler;

(D) from 0 to about 2.5 weight percent of at least one adhesion promoter; and (E) from 0 to 80 parts by weight of one or more plasticizer per 100 parts by weight of the polydiorganosiloxane which composition, upon curing, has an elongation of from about 700 percent to about 1,800 percent, a modulus value of about 0.4 Mpa or less, a skin over time of about 60 minutes or less, a tack free time of about 120 minutes or less, and a scratch time of about 180 minutes or less.

2. The composition of claim 1 wherein p is 0 or 1.

3. The composition of claim 2 wherein p is 0.

4. The composition of claim 1 wherein R' and R" have 1 to 4 carbon atoms.

5. The composition of claim 1 wherein at least one R" is methyl.

6. The composition of claim 5 wherein p is 0.

7. The composition of claim 1 wherein the ketoximino group of the phenyl substituted tris-functional ketoximino crosslinking agent is selected from the group consisting of methyl ethyl ketoximino, diethyl ketoximino, dimethyl ketoximino, methyl isobutyl ketoximino, methyl amyl ketoximino, and cyclohexanone oximino.

8. The composition of claim 1 wherein the phenyl substituted tris-functional ketoximino silane crosslinking agent is phenyl tris-(methyl ethyl ketoximino)silane.

9. The composition of claim 7 or 8 wherein p is 0.

10. The composition of claim 1 in which (B) further comprises one or more crosslinking agents of the formula $R_{4-(n+p)}Si(OR')_n(ON=CR''R''')_p$ where R, R', R" and R'" are, independently of each other, any saturated straight chain or branched alkyl radical of 1 to 8 carbon atoms, n is an integer 0, 1, 2, 3 or 4, and p is an integer 0, 1, 2, 3 or 4; where the sum of n and p is at least two.

11. The composition according to claim 1 wherein the adhesion promoter is an organofunctional silane.

12. The composition according to claim 1 wherein the composition further comprises (F) a catalyst in an amount effective to accelerate the reaction of the polydiorganosiloxane with the phenyl substituted tris-functional ketoximino silane crosslinking agent.

13. The composition according to claim 12 wherein the catalyst is a metal carboxylate catalyst.

14. The composition of claim 1 wherein the plasticizer (E) is present in an amount of from 30 to 50 parts by weight of the polydiorganosiloxane.

15. The composition of claim 14 wherein the plasticizer is a triorganosilyl endblocked diorganopolysiloxane having a viscosity ranging from 10 to 100,000 centipoise at 25° C. and wherein the organic groups are alkyl radicals of 1 to 8 carbons.

16. The composition of claim 1 wherein the polydiorganosiloxane is present in an amount of from about 10 to about 90 weight percent, said polydiorganosiloxane having a viscosity of from about 100 to about 500,000 centipoise at 25° C. and wherein said polydiorganosiloxane is selected from the group consisting of:

(i) polydiorganosiloxanes wherein the organo radicals bonded to the silicon atom are selected from the group consisting of monovalent hydrocarbon radicals and monovalent halogenated hydrocarbon radicals; and (ii) polydiorganosiloxanes which have both hydoxyl endblocking and triorganosiloxy endblocking.

17. The composition of claims 1 or 16 wherein the phenyl substituted tris-functional ketoximino silane crosslinker is present in an amount from about 1 to about 10 weight percent.

18. The compositions of claim 16 further comprising one or more crosslinking agents of the formula $R_{4-(n+p)}Si(OR')_n(ON=CR''R''')_p$ where R, R', R" and R'" are, independently of each other, any saturated straight chain or branched alkyl radical of 1 to 8 carbon atoms, n is an integer 0, 1, 2, 3 or 4, and p is an integer 0, 1, 2, 3 or; where the sum of n and p is at least two.

19. The composition of claims 1, 10, 16, or 18 wherein the phenyl substituted tris-functional ketoximino silane crosslinking agent is present in an amount of from about 3 to about 7 weight percent.

20. The composition of claim 17 wherein p is 0.

21. The composition of claim 11 wherein the organofunctional silane is an amino-functional silane or an epoxyfunctional silane.

22. The composition of claim 16 wherein the ketoximino group of the phenyl substituted tris-functional ketoximino silane crosslinking agent is selected from the group consisting of methyl ethyl ketoximino, diethyl ketoximino, dimethyl ketoximino, methyl isobutyl ketoximino, methyl amyl ketoximino, and cyclohexanone oximino.

23. The composition of claim 16 wherein the phenyl substituted trisfunctional ketoximino crosslinking agent is phenyl tris-(methyl ethyl ketoximino) silane.

24. The composition of claim 14, wherein the plasticizer is a triorganosilyl endblocked diorganopolysiloxane having a viscosity of from about 10 to about 100,000 centipoise at 25° C.

25. The composition of claim 1 wherein the phenyl substituted tris-functional ketoximino silane crosslinking agent is phenyl tris-(methyl isobutyl ketoximino)silane.

* * * * *